Patented Oct. 25, 1949

2,485,711

UNITED STATES PATENT OFFICE 2,485,711

PHENOL ALDEHYDE RESINS

George L. Doelling, St. Louis, and Kenneth H. Adams, Fenton, Mo., assignors to Mississippi Valley Research Laboratories, Inc., St. Louis, Mo., a corporation of Missouri No Drawing. Application October 10, 1945, Serial No. 621,616

22 Claims. (Cl. 260—54)

This invention relates to synthetic resins and more particularly to heat-hardened synthetic resins of the ether type.

Among the objects of this invention are the provision of improved synthetic resins which can be used in molding, laminating and surface coatings; the provision of phenol aldehyde resins which are heat-hardened yet flexible; the provision of synthetic resins of the type indicated which may be formed in situ without damaging relatively delicate fibers; the provision of synthetic resins made from a preliminary stage resin which can be applied to the material to be treated and the final thermoset resin formed in place by heating; and, the provision of synthetic resins of the type indicated which heat-harden to form hard, smooth, non-tacky and flexible films. Other objects will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

According to the present invention new synthetic resins, broadly of the phenol-formaldehyde type, are obtained by the condensation of an ether-type resin and an aldehyde or aldehyde-yielding substance. The reaction takes place in the presence of a non-acid catalyst, such as ammonia, an aliphatic amine, an aliphatic amino-alcohol or other non-acid catalyst.

The ether-resin or first stage resin is formed by the reaction of an unpolymerizable polyhydric phenol of a particular type with an organic polyhalide free of ester groups whose halogen atoms are all attached to different carbon atoms which are in turn joined to other atoms by single bonds only. Ethers of considerable chain-length are formed. These ether-resins are non-heat-hardening resins. These ethers are then reacted under heat with an aldehyde or an aldehyde-yielding compound in the absence of hydrochloric acid or any other acid catalyst. The catalyst employed is very important since acid catalysts have a deleterious effect on cloth or cellulosic fillers as well as upon the materials of which molds are constructed. The finished resin is a substantially insoluble heat-hardened resin.

The molecular structure of the compounds of the present invention is much different from that of the usual phenol-aldehyde resins. The compounds of the present invention are much less brittle, have greater impact resistance and will stand much more flexing than the usual phenol-aldehyde resins.

Not all dihydric phenols can be employed in the preparation of a suitable first stage resin. Dihydric phenols such as catechol, di-(4-hydroxypheny)dimethyl methane and hydroquinone will form ethers with dihalogen compounds, but do not react to any appreciable extent with aldehydes or aldehyde-yielding substances under non-acid conditions. We have unexpectedly found that resorcinol and derivatives of resorcinol such as 3,5-dihydroxy toluene (methyl resorcinol), resacetophenone, ethyl resorcinol, propyl resorcinol and others will form ethers of a desired molecular weight and will react with aldehydes and aldehyde-forming materials such as hexamethylenetetramine, under non-acid conditions to form resins of new and desirable characteristics.

In general, the dihydric phenols which can be used in making the first stage resin are of the following composition:

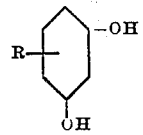

in which R represents a lower alkyl or acyl radical containing a carbon chain of not more than about six carbon atoms or hydrogen. The lower alkyl or acyl radical may be substituted in any one of the four positions not occupied by hydroxyl groups. All of these compounds may be described as 1,3-dihydric phenols. Dihalogen compounds suitable for use in the present invention include ethylene dichloride, ethylene dibromide, β,β'-dichloro diethyl ether, dichloro isopropyl ether, triglycol dichloride and other glycols and polyalkylene glycols in which the two OH groups have been replaced by halogen. The preferred dihalogen compounds are β,β'-dichloro diethyl ether and triethylene glycol dichloride, or in general, the dihalogen compounds derivable from one of the lower polyethylene glycols containing a carbon chain of not more than about six carbon atoms by replacing the two hydroxyl groups with halogen. The full chemical name for triglycol dichloride is 2-(2-chloroethoxy)-ethyl-2'-chloroethyl ether. The full chemical name for dichloro-isopropyl ether is 2,2'-dichlorodiisopropyl ether.

The first stage ether-resins made from the above described dihydric phenols and dihalogen compounds are reacted with an aldehyde such as formaldehyde, acetaldehyde, propionaldehyde, butyraldehyde, valeraldehyde, furfural, etc., or with an aldehyde-yielding substance such as hexamethylenetetramine or paraformaldehyde. Aldehydes containing more than seven carbon atoms per molecule are less desirable than the lower aldehydes for this purpose. The catalyst may be ammonia, an aliphatic amine, an aliphatic amino-alcohol, an alkali or alkaline earth-hydroxide or other non-acid catalyst.

The following examples illustrate the invention:

Example 1

An ether-resin is first made from resorcinol and $\beta,\beta'$-dichlorodiethyl ether by reacting these materials in the following proportions:

|  | Weight | Mols |
|---|---|---|
|  | Grams |  |
| Resorcinol | 275 | 2.5 |
| $\beta,\beta'$-dichlorodiethyl ether | 375.5 | 2.5 |
| Sodium hydroxide (97%) | 206.3 | 5.0 |
| Water | 875 |  |

The resorcinol was charged into a flask equipped with a mechanical stirrer and reflux condenser, the water and sodium hydroxide added and the solution heated. After these materials were in solution the dichloroethyl ether was added over about fifteen minutes while stirring, and the mixture was then heated under reflux for 23½ hours. At this time the reaction was 91.8% complete as calculated from the alkali consumed. The reaction mixture was then cooled some, neutralized with hydrochloric acid, a few milliliters of excess acid were added and the reaction product was washed with hot water. The product was then dehydrated under vacuum for several hours. The yield was 412 grams. The product was an amber-colored resin, very adhesive, not appreciably fluid at room temperature, but fluid on heating. It was soluble in dioxane, chloroform and methylethyl ketone but not in water. The molecular weight of this product by the camphor method was found to be 931, using pure $\beta,\beta'$-diphenoxydiethyl ether as a standard.

The ether-resin so obtained was reacted with hexamethylenetetramine by dissolving 3 grams of the ether-resin in 3 milliliters of methylethyl ketone and adding to this solution 3 milliliters of a solution of 10 grams of hexamethylenetetramine in 100 milliliters of methanol. About 1 milliliter of this mixture was placed on a sheet metal slide about two inches square. The solvent was evaporated and the slide with the film of resin plus hexamethylenetetramine on it was heated for twenty minutes at 125° C. The film which was soft and tacky before this treatment was afterwards hard, smooth, relatively insoluble, non-tacky but flexible as was proved by bending the metal slide through a 45° or wider angle without breaking the film. The usual phenol-formaldehyde resins, after thermosetting, are very brittle and will break at the slightest bending of the slide in this same test. The thermoset product obtained in the present example was not soluble in methylethyl ketone, alcohol or other organic solvents, hot or cold.

Example 2

Two grams of the ether-resin from Example No. 1 were dissolved in 3 milliliters of dioxane and a solution of 1 gram of paraformaldehyde in 2 milliliters of 2-amino-2-methyl-1-propanol and 1 milliliter of methylethyl ketone was mixed with the dioxane solution. About 1 milliliter of this mixture was placed on a sheet metal slide and the solvent allowed to evaporate. The film was heated for twenty-five minutes at about 125° C. The resulting film was not tacky at 100° C. and after cooling was a hard, flexible film no longer soluble in ordinary solvents.

Example 3

Two grams of the ether-resin from Example No. 1 were dissolved in dioxane, 0.7 milliliter of 37% formaldehyde and 0.1 milliliter of concentrated aqueous ammonia were added. After solvent removal, the film was heated at about 125° C. for five to ten minutes. A non-tacky, hard, flexible film resulted.

Example 4

A similar test was made on the ether-resin from Example No. 1, to which 10% of its weight of furfural and a small amount of ammonia had been added. After solvent removal, the film was baked at about 150° C. for thirty minutes. A dark red, hard, thermoset film resulted.

Example 5

An ether-resin was made from orcinol and $\beta,\beta'$-dichlorodiethyl ether in a similar manner to Example No. 1. The materials used were as follows:

|  | Weight | Mols. |
|---|---|---|
| Orcinol (3.5-dihydroxytoluene) | 102 grams | .822 |
| $\beta,\beta'$-dichlorodiethyl ether | 117.5 grams | .822 |
| Sodium hydroxide (97%) | 67.8 grams | 1.644 |
| Water | 288 milliliters |  |

After 15.5 hours at reflux temperature the reaction was about 91.7% complete as indicated by the amount of alkali consumed. The product was worked up as in Example No. 1. The yield of ether-resin was 152 grams. The product was an amber-colored resin, rather hard and non-tacky at room temperature, but fluid at 100° C. It was soluble in dioxane and acetone but not in water. The molecular weight was 890.

This ether-resin was reacted with hexamethylenetetramine by dissolving 2 grams of the resin in 5 milliliters of methylethyl ketone and 2 milliliters of chloroform, then 0.2 gram of hexamethylenetetramine was dissolved in this solution. A film of this mixture was made on a sheet metal plate as described in Example No. 1 and baked at 125° to 130° C. for twenty minutes. The resulting film was hard and non-tacky, both hot and cold and flexible enough to stand bending of the slide through a 45° angle without breaking.

Example 6

An ether resin was made from resacetophenone and $\beta,\beta'$-dichlorodiethyl ether in the molar ratio of 1:1 in the same manner as in Example No. 1 and No. 5. The reaction was run for 22 hours after which titration showed it to be 86.2% complete. The product was worked up as described and a yield of 121 grams was obtained from 100 grams of resacetophenone. The product was a soft resin at room temperature and quite fluid at 100° C. The molecular weight of this resin was 616.

This resin was then reacted with 10% of its weight of hexamethylenetetramine at 125° to 130° C. for thirty minutes. The resulting film was hard, non-tacky and flexible, showing a definite change in properties due to reaction with the hexamethylenetetramine.

For certain purposes where a softer final film is desired a mixed ether-resin may be prepared by replacing a portion of the 1,3-dihydric phenol with a chemically equivalent amount of another dihydric phenol, the ether-resin of which substantially does not react with aldehydes under non-acid conditions. A convenient way of carrying out such incorporation is to include a dihydric phenol other than resorcinol or derivatives of resorcinol in the formation of the first stage resin.

*Example 7*

|  | Weight | Mols |
|---|---|---|
|  | Grams |  |
| Resorcinol | 73.7 | .67 |
| Di-(4-hydroxyphenyl) dimethylmethane | 76.0 | .33 |
| β,β'-dichlorodiethyl ether | 143.0 | 1.00 |
| Sodium hydroxide (97%) | 82.5 | 2.00 |
| Water | 350.0 |  |

The two dihydric phenols and part of the water were charged into the reaction vessel. The sodium hydroxide, dissolved in the rest of the water, was added and the resulting solution heated to reflux temperature. Then the dichloroethyl ether was added with stirring over about fifteen minutes time. The batch was then heated under a reflux condenser with good agitation for twenty-four hours, after which time titration indicated 89.1% conversion. The batch was neutralized, washed with hot water until free from chlorides and then dehydrated under a good vacuum, finally at 150° C. 201 grams of soft resin resulted. The molecular weight was 828.

This soft resin was reacted with hexamethylenetetramine as follows: 2 grams of the resin were dissolved in 4 milliliters of dioxane, then 4 milliliters of a solution of 5 grams of hexamethylenetetramine in 100 milliliters of chloroform were added. About 0.5 milliliter of this solution was floated on a thin sheet metal slide about 1.5 inches square and the solvent evaporated. Then the slide was baked at 125° to 130° C. for fifteen minutes. The resulting film was smooth, non-tacky and not soluble in hot acetone. It was very flexible as shown by bending the metal slide.

*Example 8*

|  | Weight | Mols |
|---|---|---|
|  | Grams |  |
| Resorcinol | 110 | 1.0 |
| Triglycol dichloride | 187 | 1.0 |
| Sodium hydroxide (97%) | 82.5 | 2.0 |
| Water | 250 |  |

These materials were reacted as in Example No. 4 except that samples were taken out at several times during the course of the reaction.

|  | Time of Reaction | Conversion | Molecular wt. of resin |
|---|---|---|---|
|  | Hours | Percent |  |
| Sample No. 1 | 3.5 | 70 | 596 |
| Sample No. 2 | 6.0 | 81.4 | 892 |
| Sample No. 3 | 8.0 | 85.1 | 994 |

Each of these three ether-resins was reacted with 10% by weight of hexamethylenetetramine in the manner described in the previous examples. The ether-resins were originally soft resins which became fluid on slight heating, but after reacting them with hexamethylenetetramine they were non-tacky at 100° C. and glossy, rigid, flexible films which adhered well to metal at room temperature.

*Example 9*

Resorcinol was reacted with ethylene dichloride in equal molecular ratio in a manner similar to that of the foregoing examples. After 23½ hours the reaction was 84.7% complete as indicated by the alkali consumed. The reaction was then stopped and the mass worked up as described above. 116.3 grams of reddish-colored resin resulted which was a viscous fluid at 100° C. but hard and brittle at room temperature. The molecular weight was 686.

This resin was then reacted with 10% by weight of hexamethylenetetramine for twenty minutes at 100° to 120° C. A thermoset resin was obtained which was non-tacky even while hot.

Other alkalis may be substituted for the sodium hydroxide utilized in the foregoing examples. It is only necessary that the alkali be strong enough to convert the phenol to a salt.

Where a proportion of dihydric phenol, whose ether-resins substantially do not react with aldehydes under non-acid conditions, is incorporated into the product, the dihydric phenol so incorporated should not constitute more than approximately 65 mole per cent of the total dihydric phenol used. As the proportion of 1,3-dihydric phenol in the ether-resin is increased the final aldehyde-treated resin film becomes progressively harder and less soluble in organic solvents. Dihydric phenols which may be thus incorporated include a bi-nuclear dihydric phenol, such as di(4-hydroxyphenyl)dimethyl methane, di(4-hydroxyphenyl)methane or derivatives of these compounds, or a mono-nuclear dihydric phenol such as catechol or hydroquinone and their derivatives. The mono-nuclear dihydric phenols may be of the following type:

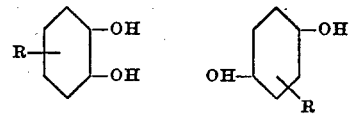

in which R represents a lower alkyl or acyl group containing a carbon chain of not more than about six carbon atoms or hydrogen. The lower alkyl or acyl radical may be substituted in any one of the four positions not occupied by hydroxyl groups.

The final resin products of the present invention are useful in molding compounds, laminates, surface coatings for metal, cloth or wood and as textile impregnants. A cloth laminate was made from the first stage ether-resin of Example No. 1 and 10% by weight of hexamethylenetetramine. The cloth was soaked in a solution containing these materials so that there was 59.5% by weight resin and hexamethylenetetramine and 40.5% cloth in the impregnated cloth. Nine plies of this treated cloth were pressed together in a hydraulic press at 250° F. for nine minutes. The resulting laminate was firmly bonded. A test piece of it was placed in boiling methylethyl ketone for one hour with no weight loss. This indicated that the product had been thermoset or heat-hardened and also rendered insoluble by this treatment.

Similarly wood flour, cotton flock and other fillers can be impregnated with a first stage ether-resin of the present invention, an aldehyde and a non-acid catalyst and heated to form thermoset, insoluble products, which are less brittle and more impact resistant than the usual phenol-formaldehyde plastic products.

The first stage ether-resins in the foregoing examples range in molecular weight from about 600 to 1000; ether-resins both higher and lower than this in molecular weight have been made.

For example, an ether-resin, made from resorcinol and β,β'-dichloroethyl ether, had a molecular weight of 1620 and after reaction with hexamethylenetetramine gave an insoluble, hard, somewhat flexible resin. While ether-resins of a molecular weight from about 500 to about 2000 are preferred, fairly satisfactory products can be made from lower or higher molecular weight ether-resins. However, the low molecular weight ether-resins give lower yields, and the ether-resins of molecular weight higher than about 2000 are difficult to wash free of alkali and chlorides and not so easily dissolved in solvents and applied as are the intermediate molecular weight products.

The ratio of dihydric phenols to dihalogen compounds can be varied although it is preferably maintained at approximately a 1:1 ratio. However, resinifying proportions of these materials may be described as approximately from 1½ mols of dihydric phenol to as little as 1 mol of dihalogen compound and from 1½ mols of dihalogen compound to as little as 1 mol of dihydric phenol. The ratio of sodium hydroxide and water can also be varied as can the ratio of aldehyde to ether-resin to catalyst. Preferably from 2 to 15% of formaldehyde or hexamethylenetetramine or approximately equivalent amounts of other aldehydes are employed.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

We claim:

1. A heat-hardened substantially insoluble resin comprising the product of reaction under alkaline conditions of a non-heat-hardening resin, consisting essentially of ether linkages, and an aldehyde, said non-heat-hardening resin comprising the product of reaction under alkaline conditions in approximately equimolecular proportions of a 1,3-dihydric mono-nuclear phenol and an aliphatic dihalide free of ester groups whose halogen atoms are attached to different carbon atoms which are in turn joined to other atoms by single bonds only, said dihalide containing not more than about six carbon atoms, being free of other reactive groups and containing no other elements than those chosen from the group consisting of halogen, carbon, hydrogen and oxygen, said non-heat-hardening resin having a molecular weight of not substantially less than 500 nor more than 2000, said phenol having the following formula:

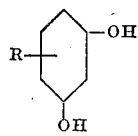

in which R is a radical selected from the group consisting of hydrogen, acyl and alkyl radicals containing not more than approximately six carbon atoms.

2. A heat-hardened substantially insoluble resin comprising the product of reaction under alkaline conditions of a non-heat-hardening resin, consisting essentially of ether linkages, and an aldehyde containing not over five carbon atoms per molecule, said non-heat-hardening resin having a molecular weight of not substantially less than 500 nor more than 2000 and comprising the product of reaction under alkaline conditions in approximately equimolecular proportions of a 1,3-dihydric mono-nuclear phenol and an aliphatic dihalogen compound derivable from one of the lower polyethylene glycols containing not more than about six carbon atoms by replacing the two hydroxyl groups with halogen, said phenol having the follownig formula:

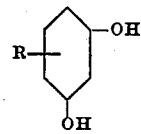

in which R is a radical selected from the group consisting of hydrogen, acyl and alkyl radicals containing not more than approximately six carbon atoms.

3. A substantially insoluble heat-hardened resin comprising the product of reaction under alkaline conditions of a non-heat-hardening resin, consisting essentially of ether linkages, and hexamethylenetetramine, said non-heat-hardening resin comprising the product of reaction under alkaline conditions in approximately equimolecular proportions of a 1,3-dihydric mono-nuclear phenol and an aliphatic dihalide free of ester groups whose halogen atoms are attached to different carbon atoms which are in turn joined to other atoms by single bonds only, said dihalide containing not more than about six carbon atoms, being free of other reactive groups and containing no other elements than those chosen from the group consisting of halogen, carbon, hydrogen and oxygen, said non-heat-hardening resin having a molecular weight of not substantially less than 500 nor more than 2000, said phenol having the following formula:

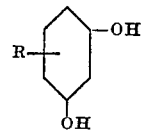

in which R is a radical selected from the group consisting of hydrogen, acyl and alkyl radicals containing not more than approximately six carbon atoms.

4. A substantially insoluble heat-hardened resin comprising the product of reaction under alkaline conditions of a non-heat-hardening resin, consisting essentially of ether linkages, and hexamethylenetetramine, said non-heat-hardening resin comprising the product of reaction under alkaline conditions in approximately equimolecular proportions of β,β'-dichlorodiethyl ether and resorcinol and having a molecular weight of not substantially less than 500 nor more than 2000.

5. A substantially insoluble heat-hardened resin comprising the product of reaction under alkaline conditions of a non-heat-hardening resin, consisting essentially of ether linkages, and an aldehyde containing not over five carbon atoms per molecule, said non-heat-hardening resin having a molecular weight of not substantially less than 500 nor more than 2000 and comprising the product of reaction under alkaline conditions in approximately equimolecular proportions of β,β'-dichlorodiethyl ether and a 1,3- dihydric mono-nuclear phenol, said phenol having the following formula:

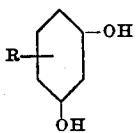

in which R is a radical selected from the group consisting of hydrogen, acyl and alkyl radicals containing not more than approximately six carbon atoms.

6. A substantially insoluble heat-hardened resin comprising the product of reaction under alkaline conditions of a non-heat-hardening resin, consisting essentially of ether linkages, and hexamethylenetetramine, said non-heat-hardening resin comprising the product of reaction under alkaline conditions in approximately equimolecular proportions of $\beta,\beta'$-dichlorodiethyl ether and orcinol, said non-heat-hardening resin having a molecular weight of not substantially less than 500 nor more than 2000.

7. A substantially insoluble heat-hardened resin comprising the product of reaction under alkaline conditions of a non-heat-hardening resin, consisting essentially of ether linkages, and hexamethylenetetramine, said non-heat-hardening resin comprising the product of reaction under alkaline conditions in approximately equimolecular proportions of triglycol dichloride and resorcinol, said non-heat-hardening resin having a molecular weight of not substantially less than 500 nor more than 2000.

8. A substantially insoluble heat-hardened resin comprising the product of reaction under alkaline conditions of a non-heat-hardening resin, consisting essentially of ether linkages, and hexamethylenetetramine, said non-heat-hardening resin comprising the product of reaction under alkaline conditions in approximately equimolecular proportions of ethylene dichloride and resorcinol, said non-heat-hardening resin having a molecular weight of not substantially less than 500 nor more than 2000.

9. A heat-hardened resin comprising the product of reaction under alkaline conditions of a non-heat-hardening resin, consisting essentially of ether linkages, and an aldehyde, said non-heat-hardening resin comprising the product of reaction under alkaline conditions of a 1,3-dihydric mono-nuclear phenol and not over 65 mole per cent of another substantially unpolymerizable dihydric phenol with an aliphatic dihalide free of ester groups whose halogen atoms are attached to different carbon atoms which are in turn joined to other atoms by single bonds only, said dihalide containing not more than about six carbon atoms, being free of other reactive groups and containing no other elements than those chosen from the group consisting of halogen, carbon, hydrogen and oxygen, the proportion of said phenols to said dihalide being approximately equimolecular, said non-heat-hardening resin having a molecular weight of not substantially less than 500 nor more than 2000, said 1,3-dihydroxy phenol having the following formula:

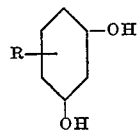

In which R is a radical selected from the group consisting of hydrogen, acyl and alkyl radicals containing not more than approximately six carbon atoms, and said other phenol having a formula selected from the group consisting of:

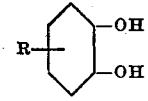

and

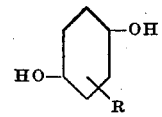

in which R is a radical selected from the group consisting of hydrogen, acyl and alkyl radicals containing not more than approximately six carbon atoms.

10. The method of synthesizing substantially insoluble heat-hardened resins which comprises reacting in an alkaline medium and in approximately equimolecular proportions, a 1,3-dihydric mono-nuclear phenol and an aliphatic dihalide free of ester groups whose halogen atoms are attached to different carbon atoms which are in turn joined to other atoms by single bonds only, said dihalide containing not more than about six carbon atoms, being free of other reactive groups and containing no other elements than those chosen from the group consisting of halogen, carbon, hydrogen and oxygen, and then reacting the ether-resin formed with an aldehyde containing not over five carbon atoms per molecule in the presence of an alkaline catalyst, said first reaction being stopped at a point where the ether-resin formed has a molecular weight of not substantially less than 500 nor more than 2000, said phenol having the following formula:

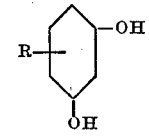

in which R is a radical selected from the group consisting of hydrogen, acyl and alkyl radicals containing not more than approximately six carbon atoms.

11. The method of synthesizing substantially insoluble heat-hardened resins which comprises reacting in an alkaline medium and in approximately equimolecular proportions, a resorcinol and an aliphatic dihalide free of ester groups whose halogen atoms are attached to different carbon atoms which are in turn joined to other atoms by single bonds only, said dihalide containing not more than about six carbon atoms, being free of other reactive groups and containing no other elements than those chosen from the group consisting of halogen, carbon, hydrogen and oxygen, and then reacting the ether-resin formed with an aldehyde containing not over five carbon atoms per molecule in the presence of an alkaline catalyst, said first reaction being stopped at a point where the ether-resin has a molecular weight of not substantially less than 500 nor more than 2000, said resorcinol having the following formula:

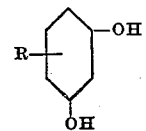

in which R is a radical selected from the group consisting of hydrogen, acyl and alkyl radicals containing not more than approximately six carbon atoms.

12. The method of synthesizing substantially insoluble heat-hardened resins which comprises reacting in an alkaline medium and in approximately equimolecular proportions a resorcinol and an aliphatic dichloride free of ester groups whose chlorine atoms are attached to different carbon atoms which are in turn joined to other atoms by single bonds only, said dihalide containing not more than about six carbon atoms, being free of other reactive groups and containing no other elements than those chosen from the group consisting of halogen, carbon, hydrogen and oxygen, and then reacting the ether-resin formed with an aldehyde containing not over five carbon atoms per molecule in the presence of an alkaline catalyst, said first reaction being stopped at a point where the ether-resin has a molecular weight of not substantially less than 500 nor more than 2000, said resorcinol having the following formula:

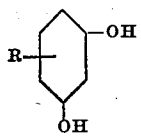

in which R is a radical selected from the group consisting of hydrogen, acyl and alkyl radicals containing not more than approximately six carbon atoms.

13. The method of synthesizing substantially insoluble heat-hardened resins which comprises reacting in an alkaline medium and in approximately equimolecular proportions resorcinol and β,β'-dichlorodiethyl ether and then reacting the product with hexamethylenetetramine under alkaline conditions, said first reaction being stopped at a point where the product has a molecular weight of not substantially less than 500 nor more than 2000.

14. The method of synthesizing substantially insoluble heat-hardened resins which comprises reacting in an alkaline medium and in approximately equimolecular proportions orcinol and β,β'-dichlorodiethyl ether and then reacting the product with hexamethylenetetramine under alkaline conditions, said first reaction being stopped at a point where the product has a molecular weight of not substantially less than 500 nor more than 2000.

15. The method of synthesizing substantially insoluble heat-hardened resins which comprises reacting in an alkaline medium and in approximately equimolecular proportions resorcinol and triglycol dichloride and then reacting the product with hexamethylenetetramine under alkaline conditions, said first reaction being stopped at a point where the product has a molecular weight of not substantially less than 500 nor more than 2000.

16. The method of synthesizing substantially heat-hardened resins which comprises reacting in an alkaline medium and in approximately equimolecular proportions resorcinol and ethylene dichloride and then reacting the product with hexamethylenetetramine under alkaline conditions, said first reaction being stopped at a point where the product has a molecular weight of not substantially less than 500 nor more than 2000.

17. The method of synthesizing heat-hardened resins which comprises reacting in an alkaline medium resorcinol and di-(4-hydroxyphenyl) dimethylmethane with β,β'-dichlorodiethyl ether, the proportion of said phenols to said dihalide being approximately equimolecular, and then reacting the ether-resin formed with hexamethylenetetramine under alkaline conditions, the proportion of di-(4-hydroxyphenyl) dimethylmethane being not over 65 mole per cent of the total dihydric phenol reactants, said first reaction being stopped at a point where the ether-resin has a molecular weight of not substantially less than 500 nor more than 2000.

18. The method of synthesizing heat-hardened resins which comprises reacting in an alkaline medium a resorcinol and another unpolymerizable dihydric mono-nuclear phenol with an aliphatic dihalide free of ester groups whose halogen atoms are attached to different carbon atoms which are in turn joined to other atoms by single bonds only, said dihalide containing not more than about six carbon atoms, being free of other reactive groups and containing no other elements than those chosen from the group consisting of halogen, carbon, hydrogen and oxygen, the proportion of said phenols to said dihalide being approximately equimolecular, and reacting the ether-resin formed with an aldehyde having not over five carbon atoms per molecule in the presence of an alkaline catalyst, the proportion of the last said unpolymerizable dihydric mono-nuclear phenol being not over 65 mole per cent of the total polyhydric phenol reactants, said first reaction being stopped at a point where the ether-resin has a molecular weight of not substantially less than 500 nor more than 2000, said resorcinol having the following formula:

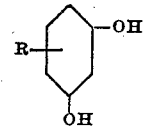

in which R is a radical selected from the group consisting of hydrogen, acyl and alkyl radicals containing not more than approximately six carbon atoms, the last said phenol having a formula selected from the group consisting of:

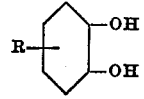

and

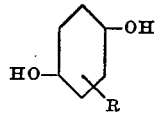

in which R is a radical selected from the group consisting of hydrogen, acyl and alkyl radicals containing not more than approximately six carbon atoms.

19. The method of synthesizing heat-hardened resins which comprises reacting in an alkaline medium a resorcinol and another unpolymerizable dihydric mono-nuclear phenol with an aliphatic dihalide free of ester groups whose halogen atoms are attached to different carbon atoms which are in turn joined to other atoms by single bonds only, said dihalide containing not more than about six carbon atoms, being free of other reactive groups and containing no other elements than those chosen from the group consisting of halogen, carbon, hydrogen and oxygen, the proportion of said phenols to said dihalide being approximately equimolecular, and reacting the ether-resin formed with an aldehyde in the presence of an alkaline catalyst, said resorcinol constituting not substantially less than 35 mole per cent of the total dihydric phenol reactants, said first reaction being stopped at a point where the ether-resin has a molecular weight of not substantially less than 500 nor more than 2000, said resorcinol having the following formula:

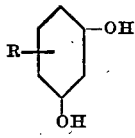

in which R is a radical selected from the group consisting of hydrogen, acyl and alkyl radicals containing not more than approximately six carbon atoms, said other phenol having a formula selected from the group consisting of:

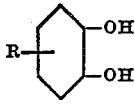

and

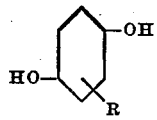

in which R is a radical selected from the group consisting of hydrogen, acyl and alkyl radicals containing not more than approximately six carbon atoms.

20. A molded article comprising essentially a substantially insoluble heat-hardened resin comprising the product of reaction under alkaline conditions of a non-heat-hardening resin, consisting essentially of ether linkages, and hexamethylenetetramine, said non-heat-hardening resin comprising the product of reaction in an alkaline medium and in approximately equimolecular proportions of a 1,3-dihydric mononuclear phenol and an aliphatic dihalide free of ester groups whose halogen atoms are attached to different carbon atoms which are in turn joined to other atoms by single bonds only, said dihalide containing not more than about six carbon atoms, being free of other reactive groups and containing no other elements than those chosen from the group consisting of halogen, carbon, hydrogen and oxygen, said non-heat-hardening resin having a molecular weight of not substantially less than 500 nor more than 2000, said phenol having the following formula:

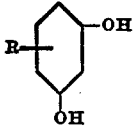

in which R is a radical selected from the group consisting of hydrogen, acyl and alkyl radicals containing not more than approximately six carbon atoms.

21. A laminated fiber article comprising essentially a substantially insoluble heat-hardened resin comprising the product of reaction under alkaline conditions of a non-heat-hardening resin, consisting essentially of ether linkages, and hexamethylenetetramine, said non-heat-hardening resin comprising the product of reaction in an alkaline medium and in approximately equimolecular proportions of a 1,3-dihydric mononuclear phenol and an aliphatic dihalide free of ester groups whose halogen atoms are attached to different carbon atoms which are in turn joined to other atoms by single bonds only, said dihalide containing not more than about six carbon atoms, being free of other reactive groups and containing no other elements than those chosen from the group consisting of halogen, carbon, hydrogen and oxygen, said non-heat-hardening resin having a molecular weight of not substantially less than 500 nor more than 2000, said phenol having the following formula:

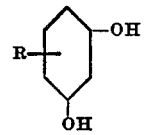

in which R is a radical selected from the group consisting of hydrogen, acyl and alkyl radicals containing not more than approximately six carbon atoms.

22. A shaped article comprising essentially an inert filler with a substantially insoluble heat-hardened resin comprising the product of reaction under alkaline conditions of a non-heat-hardening resin, consisting essentially of ether likages, and hexamethylenetetramine, said non-heat-hardening resin comprising the product of reaction in an alkaline medium and in approximately equimolecular proportions of a 1,3-dihydric mono-nuclear phenol and an aliphatic dihalide free of ester groups whose halogen atoms are attached to different carbon atoms which are in turn joined to other atoms by single bonds only, said dihalide containing not more than about six carbon atoms, being free of other reactive groups and containing no other elements than those chosen from the group consisting of halogen, carbon, hydrogen and oxygen, said non-heat-hardening resin having a molecular weight of not substantially less than 500 nor more than 2000, said phenol having the following formula:

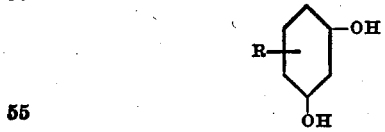

in which R is a radical selected from the group consisting of hydrogen, acyl and alkyl radicals containing not more than approximately six carbon atoms.

GEORGE L. DOELLING.
KENNETH H. ADAMS.

REFERENCES CITED

The following references are of record in the file of this patent:

UNITED STATES PATENTS

| Number | Name | Date |
|---|---|---|
| 2,051,766 | Harvey | Aug. 18, 1936 |
| 2,051,768 | Harvey | Aug. 18, 1936 |
| 2,191,587 | Rothrock | Feb. 27, 1940 |